United States Patent
Mullins (10) Patent No.: US 10,379,345 B2
(45) Date of Patent: Aug. 13, 2019

(54) VIRTUAL EXPANSION OF DESKTOP

(71) Applicant: DAQRI, LLC, Los Angeles, CA (US)

(72) Inventor: Brian Mullins, Altadena, CA (US)

(73) Assignee: DAQRI, LLC, Los Angeles, CA (US)

( * ) Notice: Subject to any disclaimer, the term of this patent is extended or adjusted under 35 U.S.C. 154(b) by 152 days.

(21) Appl. No.: 15/595,607

(22) Filed: May 15, 2017

(65) Prior Publication Data

US 2018/0332335 A1    Nov. 15, 2018

(51) Int. Cl.
*H04N 21/431* (2011.01)
*G06T 19/00* (2011.01)
*G06K 9/00* (2006.01)
*G06F 3/01* (2006.01)
*G02B 27/01* (2006.01)

(52) U.S. Cl.
CPC ............ *G02B 27/017* (2013.01); *G06F 3/011* (2013.01); *G06T 19/006* (2013.01); *G02B 2027/014* (2013.01)

(58) Field of Classification Search
CPC .......... G02B 2027/014; G02B 27/0101; G02B 27/017; G06F 3/011; G06K 9/00671; G06T 19/006; H04N 21/4312
See application file for complete search history.

(56) References Cited

U.S. PATENT DOCUMENTS

| | | | | |
|---|---|---|---|---|
| 2014/0333664 | A1* | 11/2014 | Williams | G06Q 30/0643 345/633 |
| 2015/0091780 | A1* | 4/2015 | Lyren | G02B 27/017 345/8 |
| 2016/0180592 | A1* | 6/2016 | Bean | G06F 3/0425 345/633 |
| 2016/0210784 | A1* | 7/2016 | Ramsby | G06T 19/006 |

* cited by examiner

*Primary Examiner* — Afroza Chowdhury
(74) *Attorney, Agent, or Firm* — Schwegman Lundberg & Woessner, P.A.

(57) ABSTRACT

An augmented-reality device comprises an optical sensor and a transparent display. The augmented-reality device detects, using the optical sensor, a first physical display located within a display distance of the augmented-reality device. The first physical display is connected to a computer. The augmented-reality device generates a virtual display configured to operate as a second physical display. The computer controls the second physical display. The augmented-reality device displays the virtual display in the transparent display. The virtual display appears adjacent to the first physical display.

18 Claims, 8 Drawing Sheets

VIRTUAL EXPANSION OF DESKTOP

TECHNICAL FIELD

The subject matter disclosed herein generally relates to an augmented-reality application. Specifically, the present disclosure addresses systems and methods for generating a virtual expansion of a computer desktop.

BACKGROUND

An augmented-reality (AR) device can be used to generate and display data in addition to an image captured with the AR device. For example, AR is a live, direct, or indirect view of a physical, real-world environment whose elements are augmented by computer-generated sensory input such as sound, video, graphics, or Global Positioning System (GPS) data. With the help of advanced AR technology (e.g., adding computer vision and object recognition), the information about the surrounding real world of the user becomes interactive. Device-generated (e.g., artificial) information about the environment and its objects can be overlaid on the real world.

BRIEF DESCRIPTION OF THE DRAWINGS

Some embodiments are illustrated by way of example and not limitation in the figures of the accompanying drawings.

DETAILED DESCRIPTION

Example methods and systems are directed to expanding a surface area of a physical computer monitor with the use of an augmented-reality device. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Multiple screens (computer monitors) can be connected to a computer to enable a user to view a large amount of information at the same time. For example, dual-screen monitor setups are a popular way to display different applications at the same time. One monitor displays information from a first application running on the computer. Another monitor displays information from a second application running on the same computer. However, physical monitors require a large amount of physical desk space and can add to the cost of a workstation setup. Furthermore, multiple-monitor setups cannot be easily moved or relocated from one desk to another. Moving multiple physical monitors requires a lot of time to disconnect, disassemble, assemble, and reconnect the physical monitors.

The present application describes using a head-mounted computing device (e.g., an augmented-reality device) to expand the surface of the physical monitor connected to a computer by displaying virtual monitors that are perceived adjacent to the actual physical monitor. The user of the augmented-reality device perceives the virtual monitors as secondary monitors that are connected to the actual physical monitor and the computer. For example, the user of the augmented-reality device sees an additional screen beside or above the physical monitor. The augmented-reality device displays information from one or more applications running or operating on the computer in the virtual monitor. The number and size of the virtual monitors can be configured by the augmented-reality device and the computer. In one example embodiment, the augmented-reality device adjusts (or rotates) the orientation of the virtual monitor (e.g., portrait or landscape) based on a content or type of information to be displayed. For example, the augmented-reality device detects that the information to be displayed in a virtual monitor includes a text document. In response to detecting the text document, the augmented-reality device configures and displays a virtual monitor in a portrait mode next to the actual physical monitor.

In another example embodiment, the augmented-reality device adjusts the size of the virtual monitor based on the content in the display. For example, instead of displaying a virtual monitor with a window of an application of a clock, a virtual clock may be displayed without graphical windows or a frame of the virtual monitor.

In one example embodiment, a user wears an augmented-reality device to see one or more virtual computer displays (e.g., virtual monitors) in addition to an actual physical computer display (e.g., a monitor). For example, the augmented-reality device includes a transparent display that displays virtual content (e.g., virtual monitors) that are perceived to be placed adjacent to the actual physical computer display.

In another example embodiment, a user wears an augmented-reality device to see multiple virtual screens in addition a screen of a television. For example, the augmented-reality device communicates with the television to access the content being displayed on the television (e.g., which program on what channel). The the augmented-reality device includes a transparent display that displays virtual content (e.g., virtual screens) that are perceived to be placed adjacent to the actual physical television screen. The virtual screens display content related or unrelated to the content being display on the television screen. For example, if the television screen displays a movie, a virtual screen appearing next to the television screen may display trivia info on the movie or information about the actors in a current scene on the screen. In another example, if the television screen displays a music video, a virtual screen appears next to the television screen and may display lyrics synchronized to the music video being played on the television screen.

In one example embodiment, the augmented-reality device detects, using an optical sensor, a first physical display located within a predefined distance of the augmented-reality device. The first physical display is connected to a computer. The augmented-reality device generates a virtual display configured as a second physical display. The computer controls the second physical display, even though there is no second physical display connected to the computer. The augmented-reality device displays the virtual display in the transparent display. The virtual display appears (to a user of the augmented-reality device) adjacent to the first physical display.

In another example embodiment, the augmented-reality device detects the computer, generates a unique display identifier, and causes the computer to display the unique display identifier in the first physical display. The augmented-reality device detects that the unique display identifier is displayed in the first physical display and confirms that the first physical display is associated with the computer based on the detection.

In another example embodiment, the augmented-reality device accesses an application operating on the computer connected to the physical computer display and displays content of the application in the virtual display. In another example, the augmented-reality device accesses a second application operating on the computer. The computer already operates a first application. The augmented-reality device displays content of the second application in the virtual display. The physical computer display displays content of the first application.

In another example embodiment, the computer detects a user input at the computer, determines that the user input is related to the second application, and updates the content of the second application based on the user input. The augmented-reality device updates the content of the second application in the virtual display in response to the user input at the computer.

In another example embodiment, the augmented-reality application determines that the virtual display is located within a predefined central area of the transparent display, and causes the computer to update content of the virtual display in response to determining that the virtual display is located within a predefined central area of the transparent display.

In another example embodiment, the augmented-reality device determines that the virtual display is located within a predefined central area of the transparent display. The augmented-reality device then notifies the computer that the virtual display has been selected in response to the determining that the virtual display is located within the predefined central area of the transparent display. The computer receives a user input related to the second application displayed in the virtual display in response to the notifying. The augmented-reality device causes the computer to update content of the virtual display in response to the user input.

In another example embodiment, the augmented-reality device determines that a graphical display of the first application is maximized in the physical computer display and that a graphical display of the second application is minimized in the physical computer display. The augmented-reality device causes the graphical display of the second application to be maximized in the virtual display in response to determining that the graphical display of the second application is minimized in the physical computer display.

In another example embodiment, the augmented-reality device determines that the graphical display of the second application is maximized in the physical computer display. The augmented-reality device causes the graphical display of the second application to be minimized in the virtual display in response to determining that the display of the second application is maximized in the physical computer display.

In another example embodiment, the augmented-reality device communicates with a display driver of the computer, the display driver configured to generate a first desktop area in the first physical display and to generate a second desktop area in the virtual display, the second desktop area being an expansion of the first desktop area.

In another example embodiment, a non-transitory machine-readable storage device may store a set of instructions that, when executed by at least one processor, causes the at least one processor to perform the method operations discussed within the present disclosure.

Figure 1:
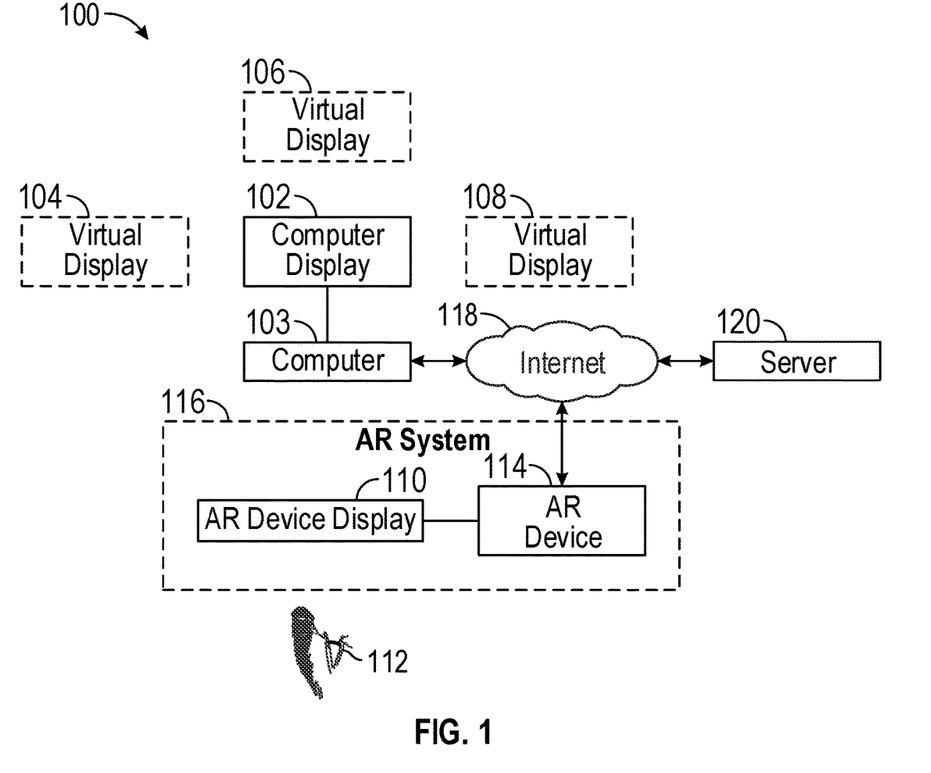
FIG. 1 is a block diagram illustrating an example of a network environment suitable for operating an augmented reality-based desktop system, according to some example embodiments.

FIG. 1 is a block diagram illustrating an example of a network environment 100 suitable for operating an augmented reality-based desktop system, according to some example embodiments. The network environment 100 includes a computer 103, an augmented-reality (AR) system 116, and a server 120 communicatively coupled to each other via a computer network (e.g., the Internet 118).

The computer 103 is connected to a computer display 102 (e.g., a monitor). Both the computer 103 and the AR system 116 execute a virtual desktop application that enables the AR system 116 to perceive virtual displays (e.g., computer monitors) 104, 106, 108 presented adjacent (next to, or within a few inches next to) to the computer display 102. In another example embodiment, the virtual displays may not be adjacent but placed within a few feet of the computer display 102. For example, the virtual display 102 may be located on a table. A virtual display may be generated to appear on a wall behind the table or on another to the side of the table or anywhere within a room containing the table. The computer 103, the AR system 116, and the server 120 may each be implemented in a computer system, in whole or in part, as described below with respect to FIG. 13.

The server 120 may be part of a network-based system. For example, the network-based system may be or include a cloud-based server system that provides AR content (e.g., content in the virtual displays 104, 106, 108; AR experience including three-dimensional (3D) models of virtual objects, animations, images, and video) to the AR system 116.

The AR system 116 includes an AR device 114 connected to an AR device display 110. The AR system 116 may include a wearable computing device (e.g., smart glasses, a smart visor, smart eyewear, a smart helmet, a smart phone) that a user can wear to see or experience the AR content related to applications operating on the computer 103, the computer display 102, or other predefined physical objects at a specific geographic location in a real-world physical environment. FIG. 1 illustrates an example embodiment of a user 112 looking through the AR device display 110 (e.g., a transparent display) to view an AR experience (e.g., virtual displays 104, 106, 108) as an overlay to the computer display 102. In one example, the virtual displays 104, 106, 108 are triggered and displayed in the AR device display 110 when an optical device (e.g., a camera) of the AR device 114 captures an image of the computer display 102 and detects the computer 103. In another example, the AR device display 110 includes a non-transparent display.

The user 112 may be a user of a virtual desktop application executed in the AR device 114, the computer 103, or the server 120. The user 112 may be a human user (e.g., a human being), a machine user (e.g., a computer configured by a software program to interact with the AR device 114), or any suitable combination thereof (e.g., a human assisted by a machine or a machine supervised by a human). The user 112 is not part of the network environment 100, but is associated with the AR device 114.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 13. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The computer network (e.g., the Internet 118) may be any network that enables communication between or among machines (e.g., server 120), databases, and devices (e.g., AR device 114). Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Figure 2:
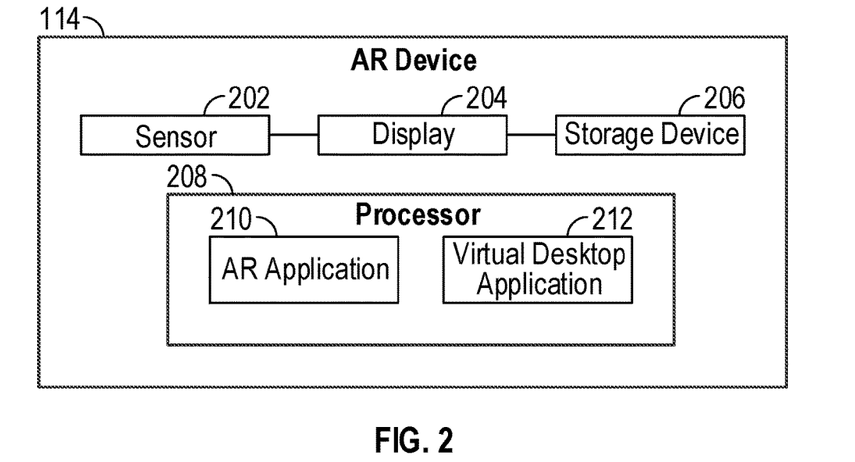
FIG. 2 is a block diagram illustrating an example embodiment of an augmented-reality device.

FIG. 2 is a block diagram illustrating an example embodiment of the AR device 114. The AR device 114 may be a wearable device that includes sensors 202, a display 204, a storage device 206, and a processor 208. The AR device 114 may include any type of device that can be worn on the head of a user (e.g., the user 112) such as a headband, a hat, or a visor.

The sensors 202 may be used to generate internal tracking data (e.g., using gyroscope data, accelerometer data, or inertial motion unit data) of the AR device 114 to determine a position and an orientation of the AR device 114. The position and the orientation of the AR device 114 may be used to identify real-world objects in a field of view of the AR device 114. For example, a virtual object may be rendered and displayed in the display 204 when the sensors 202 indicate that the AR device 114 detects or is oriented towards a predefined real-world object (e.g., when the user 112 looks at the computer display 102 using the AR device 114). In another example, the AR device 114 displays a virtual object based on a current geographic location of the AR device 114. For example, only the virtual display 106 is displayed next to the computer display 102 when the user 112 is located at his or her home address. On the other hand, the virtual displays 104 and 108 are displayed next to the computer display 102 when the user 112 is located at his or her work address. Therefore, different virtual display settings (e.g., number of virtual displays and positions relative to the computer display 102) can be configured based on the location of the AR device 114 and the computer display 102.

In another example, different levels of content (or virtual display configuration) in the virtual display may be displayed based on a profile of the user 112. For example, more information may be displayed in the virtual display to a user who is an avid gamer than to a user who is a novice gamer. For example, the avid gamer may wish to see three virtual displays in addition to the one physical computer display 102. The novice gamer may be overwhelmed by the number of virtual displays, and thus may wish to see one virtual display in addition to the one physical computer display 102.

Examples of sensors 202 include a camera, an audio sensor, an Inertial Motion Unit (IMU) sensor, a geographic location sensor, a barometer, a humidity sensor, an ambient light sensor, and a biometric sensor. It is to be noted that the sensors 202 described herein are for illustration purposes. The sensors 202 are thus not limited to the ones described.

The display 204 includes a display surface or lens capable of displaying AR content (e.g., an image of a virtual display or monitor) generated by the processor 208. The display 204 may be transparent so that the user 112 can see through the display 204 (e.g., such as a head-up display).

The storage device 206 stores a library of AR markers, AR content/experiences, a profile of the user 112, and customized playspaces for the user 112. The AR content/experiences may include two- or three-dimensional models of virtual objects with corresponding audio.

The storage device 206 may also store a database that identifies reference objects (visual references or unique identifiers associated with the computer display 102 or the computer 103) and corresponding AR experiences (e.g., a virtual display, content in the virtual display, animations, 3D virtual objects, or interactive features of the 3D virtual objects).

In one example embodiment, the AR device 114 communicates over the Internet 118 with the server 120 to access a database of the computers and computer displays from the server 120. For example, the AR device 114 retrieves identifiers (that confirm the presence of virtual displays) related to the computer 103 and the computer display 102 from the server 120. Once the AR device 114 detects that the user 112 is next to (e.g., up to five feet away from) the computer 103 (associated with an identifier from the database in the server 120) and that the user 112 is looking at the computer display 102 connected to the computer 103, the AR device 114 generates virtual displays in the display 204.

The processor 208 includes an AR application 210 and a virtual desktop application 212. The AR application 210 generates a display of virtual content when the AR device 114 detects a physical object such as the computer display 102. In one example embodiment, the AR application 210 generates virtual content overlaid on an image or a view of the computer display 102 when the AR device 114 captures an image of the computer display 102, recognizes the computer display 102, and determines that the computer display 102 is connected to the computer 103 located at a predefined geographic location.

The virtual desktop application 212 detects the presence of the computer 103 (e.g., via computer vision, visual object recognition, or wireless means such as Bluetooth) and the presence of the computer display 102. After detecting the computer 103, the virtual desktop application 212 communicates with the computer 103 to access data related to information being displayed in the computer display 102. In one example, the virtual desktop application 212 accesses an application running on the computer 103 and displays the information from that application in the virtual display 104. In another example, the virtual desktop application 212 accesses a background application running in a background on the computer 103 and not being displayed on the computer display 102. The virtual desktop application 212 displays information from the background application in the virtual display 104.

Figure 3A:
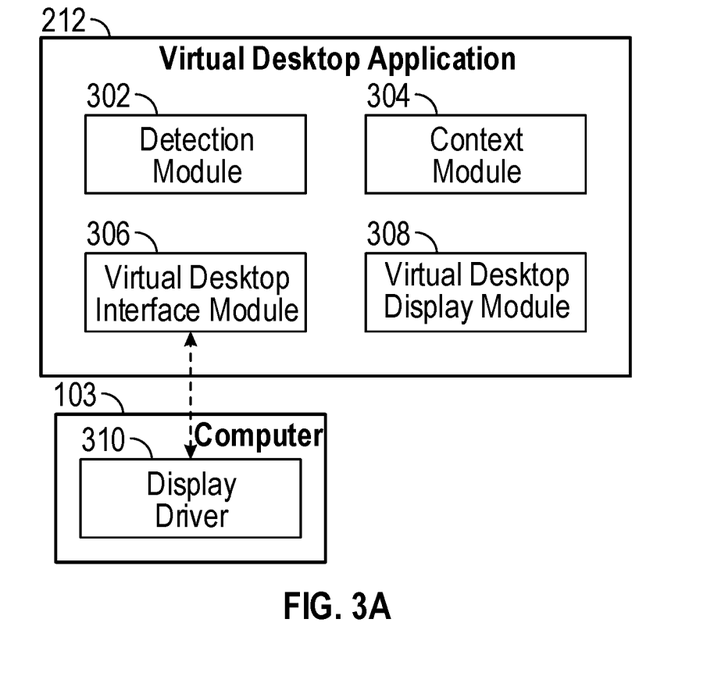
FIG. 3A is a block diagram illustrating an example embodiment of a virtual desktop application.

FIG. 3A is a block diagram illustrating modules (e.g., components) of the virtual desktop application 212. The virtual desktop application 212 includes a detection module 302, a context module 304, a virtual desktop interface module 306, and a virtual desktop display module 308. The detection module 302 includes instructions to determine whether to activate the display of virtual monitors. In one example embodiment, the detection module 302 detects the presence of the computer 103 (e.g., via wireless means). Furthermore, the detection module 302 detects and identifies the computer display 102 connected to the computer 103. In one example, the detection module 302 instructs the computer 103 to display a unique identifier (e.g., a code or an image) on the computer display 102. The detection module 302 captures an image of the computer display 102 using the sensor 202 and verifies that the content in the image of the computer display 102 includes the code or the image provided by the detection module 302 to the computer 103 to confirm that the computer display 102 is connected to the computer 103. In another example, the detection module 302 determines whether an image of the computer display 102 includes a unique identifier (e.g., a bar code in a corner of the frame of the computer display 102). The detection module 302 may determine that the computer display 102 is connected to the computer 103 based on the unique identifier.

The context module 304 accesses the computer 103 to determine which applications are running on the computer 103 and which applications are being displayed on the computer display 102. For example, the context module 304 determines that a word processing application is running on the computer 103 and is being displayed in the computer display 102. Furthermore, the context module 304 accesses the computer 103 to determine which applications or application graphical user interfaces (e.g., windows) are minimized, maximized, or displayed in the computer display 102. In one example embodiment, the context module 304 intercepts data from a display driver 310 of the computer 103 to determine what applications are being displayed in the computer display 102. In another example embodiment, the context module 304 determines the number of document "tabs" present in an application. For example, a spreadsheet application enables a user to open several spreadsheets at the same time. Each spreadsheet may be identified with a corresponding tab. The context module 304 identifies the number of open tabs in the spreadsheet application.

Figure 3B:
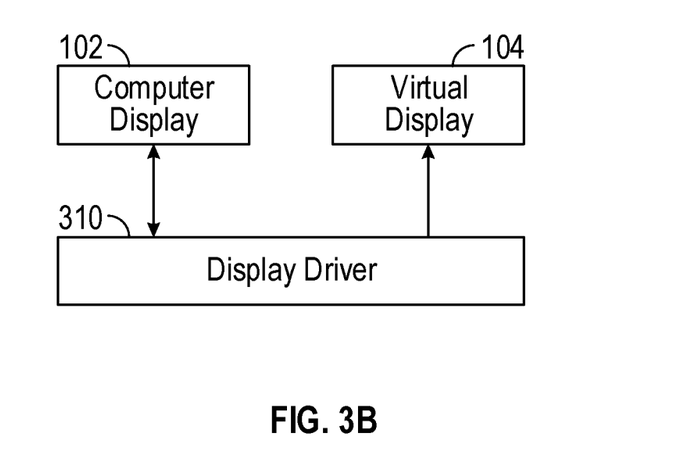
FIG. 3B is a block diagram illustrating an example of a display driver providing output to both a computer display and a virtual display.

The virtual desktop interface module 306 interfaces with the applications operating in the computer 103. For example, the virtual desktop interface module 306 accesses information related to another application operating in the computer 103, an application not displayed in the computer display 102, a spreadsheet in a tab of a spreadsheet application, or other information from the computer 103. In another example embodiment, the virtual desktop interface module 306 communicates with the display driver 310 of the computer 103. The virtual desktop interface module 306 interfaces with the display driver 310 to be perceived as a secondary or additional physical monitor being physically connected to the computer 103. FIG. 3B illustrates an example of the display driver 310 providing output to both the computer display 102 (e.g., a primary display) and the virtual display 104 (e.g., a secondary display).

In another example embodiment, the computer 103 includes a computer application configured to communicate with the virtual desktop application 212 and to provide data for the virtual display 104. Examples of operations of the computer application on computer 103 are illustrated with respect to FIGS. 4-9.

The virtual desktop display module 308 generates a display of the virtual display 104 in the display 204. For example, the virtual desktop display module 308 receives the information to be displayed (e.g., content of a graphical user interface of an application) from the virtual desktop interface module 306 and displays the information in the virtual display 104. In one example embodiment, the virtual desktop display module 308 renders a virtual object that appears as a virtual monitor positioned adjacent to the computer display 102. The content of the virtual monitor includes the graphical user interface (e.g., window) of an application operating on the computer 103. In another example embodiment, the virtual desktop display module 308 displays the virtual monitor in a predefined configuration based on the context determined by the context module 304. For example, different types of applications may be displayed at different virtual displays at specific locations. So, if a spreadsheet application is minimized in the computer display 102, the spreadsheet document is displayed in the virtual display 104. If a word processing application is minimized in the computer display 102, the word processing document is displayed in the virtual display 108.

Any one or more of the modules described herein may be implemented using hardware (e.g., the processor 208) or a combination of hardware and software. For example, any module described herein may configure the processor 208 to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
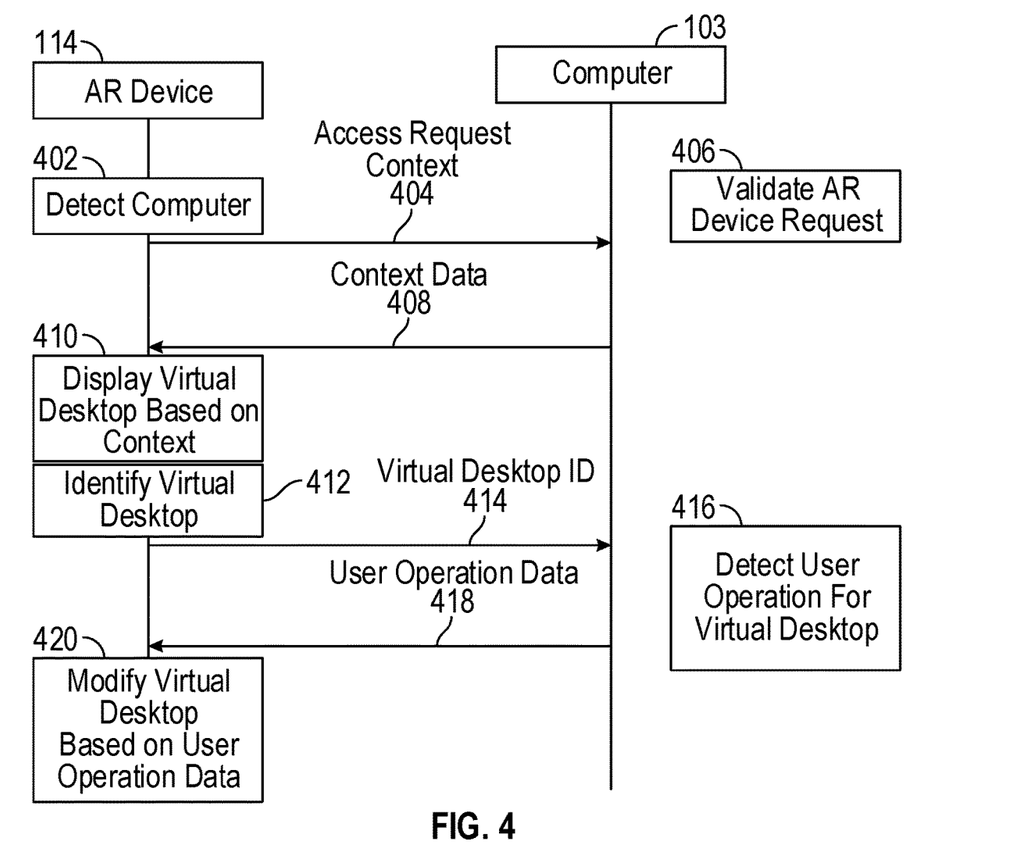
FIG. 4 is an interaction diagram illustrating an example embodiment of interactions between an augmented-reality device and a computer.

FIG. 4 is an interaction diagram illustrating an example embodiment of interactions between the AR device 114 and the computer 103. At operation 402, the AR device 114 detects the computer 103, by way of, for example, the detection module 302. Once the AR device 114 detects the computer 103, the AR device 114 submits a request to the computer 103 to access the computer 103 at operation 404. In one example, the AR device 114 seeks to access a context of the computer 103. Examples of context include which applications are running on the computer 103, which applications are minimized or maximized, a geographic location of the computer 103, and a user profile of the computer 103. The computer 103 validates the request of the AR device 114 (by authenticating a user of the AR device 114) at operation 406, and provides context data to the AR device 114 at operation 408.

At operation 410, the AR device 114 generates a display of a virtual desktop based on the context data. For example, the AR device 114 displays content of an application running on the computer 103. At operation 412, the AR device 114 identifies at which virtual desktop the user of the AR device 114 is looking or gazing. In one example embodiment, the AR device 114 determines that the virtual desktop is displayed in a central area or portion of the display 204. In another example embodiment, the AR device 114 determines the direction of the gaze of the user of the AR device 114 and identifies whether the user is gazing at a particular virtual desktop. At operation 414, the AR device 114 communicates an identification of the selected virtual desktop to the computer 103.

At operation 416, the computer 103 receives the identification of the selected virtual desktop and detects a user operation (or user input such as a mouse/keyboard input). The computer 103 correlates the user operation or user input to the selected virtual desktop. For example, if the user of the AR device 114 looks at the virtual display 106, user input received at the computer 103 is mapped to the application displayed in the virtual display 106. Thus, a word typed by a user on a keyboard connected to the computer 103 is used as input for the application displayed in the virtual display 106. The computer 103 generates user operation data in response to the user operation on the computer 103 at operation 416. At operation 418, the computer 103 sends the user operation data to the AR device 114. At operation 420, the AR device 114 modifies the virtual desktop based on the user operation data. So, if a user moves a mouse connected to the computer 103, the virtual desktop shows a user interface indicator (e.g., a pointer) that moves based on the mouse movement at the computer 103.

Figure 5:
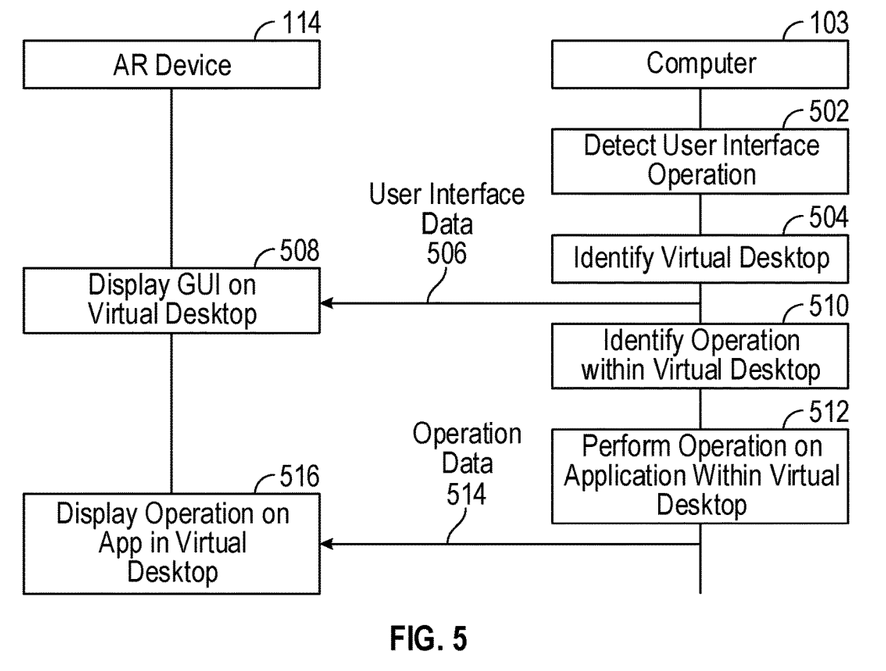
FIG. 5 is an interaction diagram illustrating another example embodiment of interactions between an augmented-reality device and a computer.

FIG. 5 is an interaction diagram illustrating another example embodiment of interactions between the AR device 114 and the computer 103. At operation 502, the computer 103 detects a user interface operation. For example, the computer 103 detects a movement of a mouse. The computer 103 identifies whether the location of the pointer based on the movement of the mouse corresponds to a particular virtual desktop. For example, the user may move the pointer located in the computer display 102 to the virtual display 104. The computer 103 maps the location of the pointer to the virtual display 104 and identifies the virtual display 104 at operation 504. In one example embodiment, the display driver 310 of the computer 103 enables the computer 103 to operate with multiple displays (e.g., one physical monitor and one virtual monitor) connected to the computer 103. For example, the display driver 310 enables the user to move the pointer between or among the multiple displays.

The computer 103 determines that the pointer is located on the virtual display and communicates information related to the pointer (e.g., user interface data) to the AR device 114 at operation 506. At operation 508, the AR device 114 displays a graphical user interface (e.g., the pointer) in the corresponding virtual display identified in operation 504. For example, the AR device 114 displays the pointer moving in the virtual display 104.

At operation 510, the computer 103 determines and identifies what type of operation is performed on the virtual desktop with the user interface (e.g., mouse, keyboard) connected to the computer 103. For example, the user may click on a particular user interface (e.g., a dialog button) of an application located and displayed in the virtual display 104. At operation 512, the computer 103 performs an operation corresponding to the operation performed with the user interface at the computer 103. For example, the computer 103 closes a window based on a mouse click on a corner of a graphical user interface of an application displayed in the virtual display 104. At operation 514, the computer 103 sends data of the operation to the AR device 114. At operation 516, the AR device 114 displays the results of the operation in the virtual desktop. For example, the AR device 114 displays a window being closed in response to the mouse click on the computer 103.

Figure 6:
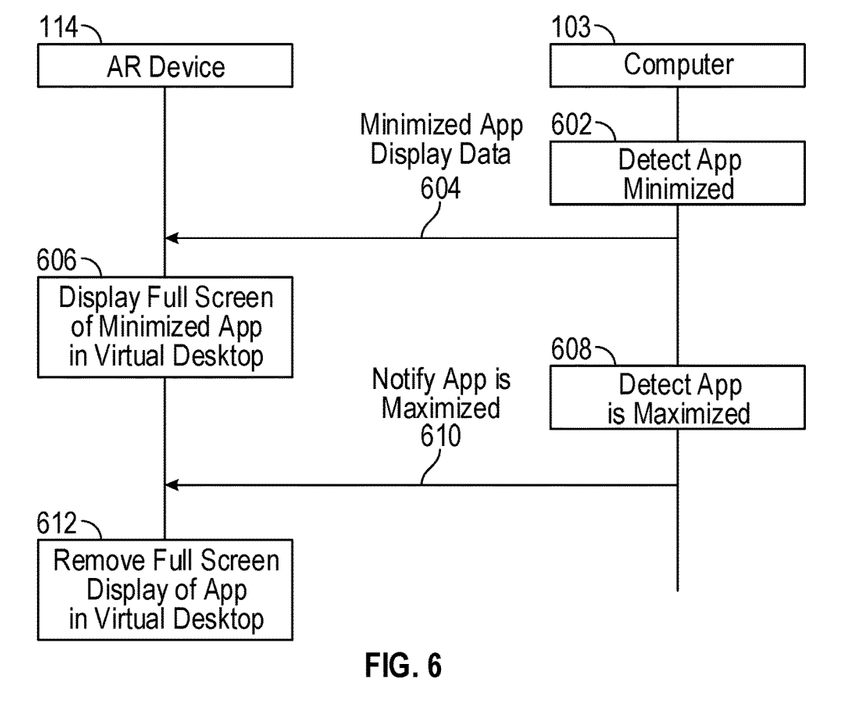
FIG. 6 is an interaction diagram illustrating another example embodiment of interactions between an augmented-reality device and a computer.

FIG. 6 is an interaction diagram illustrating another example embodiment of interactions between the AR device 114 and the computer 103. At operation 602, the computer 103 detects that a graphical user interface (e.g., a window) of an application running on the computer 103 is minimized. At operation 604, the computer 103 sends the minimized application display data to the AR device 114. The minimized application display data includes data related to the graphical user interface (e.g., content of the window) of the minimized application. At operation 606, the AR device 114 generates a display of the graphical user interface of the minimized application in the virtual desktop. For example, the AR device 114 displays a full-screen or maximized window of the graphical user interface of the minimized application operating on the computer 103.

At operation 608, the computer 103 detects that the application has been maximized in the computer display 102. The computer 103 sends a notification to the AR device 114 that the graphical user interface (e.g., window) of the application has been maximized in the computer display 102 at operation 610. In response, the AR device 114 removes the full-screen or maximized window of the graphical user interface of the corresponding application in the computer 103 at operation 612.

Figure 7:
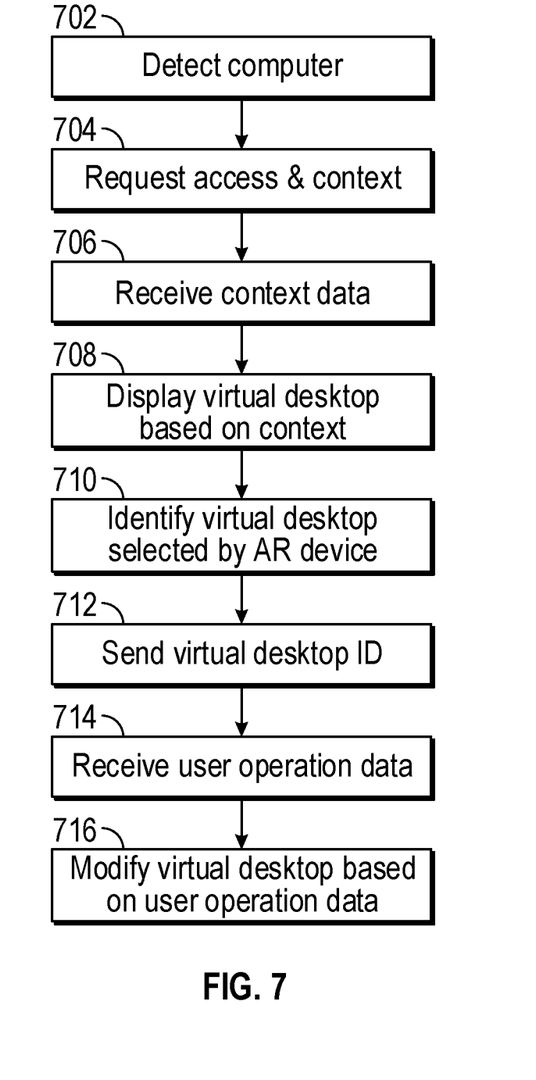
FIG. 7 is a flowchart illustrating a method for operating a virtual desktop application in an augmented-reality device, according to one example embodiment.

FIG. 7 is a flowchart illustrating a method for operating a virtual desktop application in an augmented-reality device, according to one example embodiment. At operation 702, the AR device 114 detects the computer 103. In one example embodiment, operation 702 is implemented using the detection module 302 of the virtual desktop application 212 operating in the AR device 114.

At operation 704, the AR device 114 requests access to context data of applications operating in the computer 103. In one example embodiment, operation 704 is implemented using the context module 304 of the virtual desktop application 212 operating in the AR device 114.

At operation 706, the AR device 114 receives the context data from the computer 103. In one example embodiment, operation 706 is implemented using the context module 304 of the virtual desktop application 212 operating in the AR device 114.

At operation 708, the AR device 114 displays a virtual desktop or a virtual display based on the context data received at operation 706. In one example embodiment, operation 708 is implemented using the virtual desktop display module 308 of the virtual desktop application 212 operating in the AR device 114.

At operation 710, the AR device 114 identifies a virtual desktop selected by the AR device 114. For example, the user may look at a specific virtual desktop (among several virtual desktops being displayed). In one example embodiment, operation 710 is implemented using the virtual desktop interface module 306 of the virtual desktop application 212 operating in the AR device 114.

At operation 712, the AR device 114 sends an identification of the virtual desktop selected in operation 710 to the computer 103. In other words, the AR device 114 tells the computer 103 which virtual desktop the user is looking at. In one example embodiment, operation 712 is implemented using the virtual desktop interface module 306 of the virtual desktop application 212 operating in the AR device 114.

At operation 714, the AR device 114 receives operation data related to the selected virtual desktop. For example, the operation data may include updated graphics or content to be displayed in the virtual desktop selected at operation 710. The updated content may be generated because of the user of the AR device 114 operating a mouse on the computer 103. In one example embodiment, operation 714 is implemented using the virtual desktop interface module 306 of the virtual desktop application 212 operating in the AR device 114.

At operation 716, the AR device 114 modifies content of the virtual desktop based on the user operation data received at operation 714. In one example embodiment, operation 716 is implemented using the virtual desktop display module 308 of the virtual desktop application 212 operating in the AR device 114.

Figure 8:
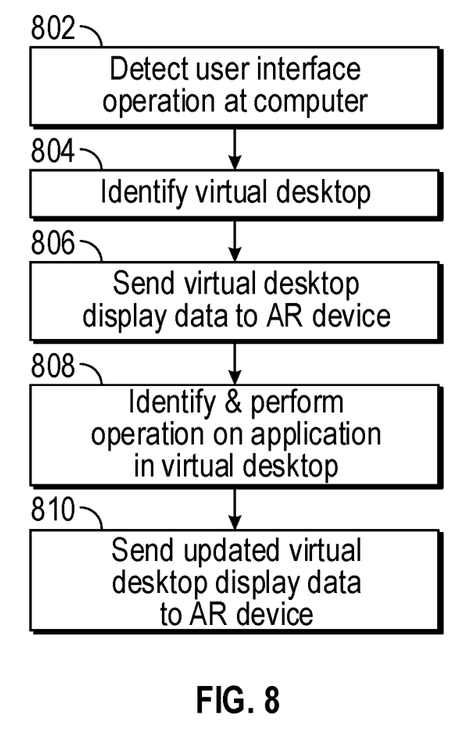
FIG. 8 is a flowchart illustrating a method for operating a virtual desktop application in an augmented-reality device, according to another example embodiment.

FIG. 8 is a flowchart illustrating a method for operating a virtual desktop application in an augmented-reality device, according to another example embodiment. At operation 802, the computer 103 detects a user interface operation (e.g., a user moving a mouse or typing on a keyboard connected to the computer 103). At operation 804, the computer 103 identifies whether the user interface operation corresponds to a virtual display. For example, if the user moves a mouse to move a pointer beyond the display area of the computer display 102, the computer 103 detects that the pointer has traveled into an area corresponding to a virtual display adjacent to the computer display 102. The computer 103 identifies the virtual desktop corresponding to the region traveled into by the pointer at operation 804.

At operation 806, the computer 103 sends virtual desktop display data to the AR device 114. The virtual desktop display data includes data related to the location of the pointer in the virtual desktop or other display data of content in the virtual desktop. At operation 808, the computer 103 identifies the operation being performed by the pointer/mouse on an application located in the virtual desktop. At operation 810, the computer 103 communicates updated visual content of the virtual desktop to the AR device 114 based on the operation identified at operation 808.

Figure 9:
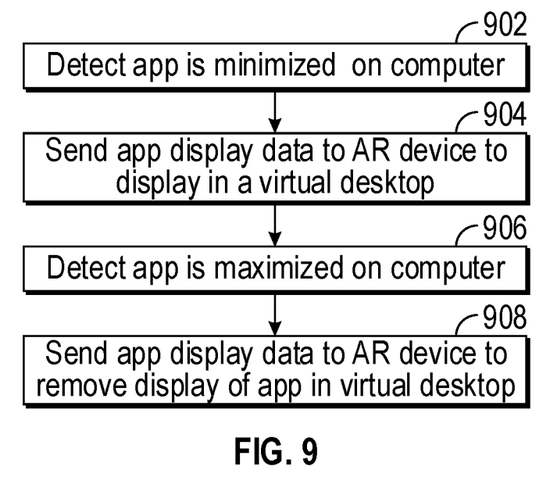
FIG. 9 is a flowchart illustrating a method for operating a virtual desktop application in an augmented-reality device, according to another example embodiment.

FIG. 9 is a flowchart illustrating a method for operating a virtual desktop application in an augmented-reality device, according to another example embodiment. At operation 902, the computer 103 detects that an application operating on the computer 103 is minimized in the computer display 102. At operation 904, the computer 103 sends display data that includes content of the maximized display of the application to the AR device 114. The AR device 114 displays the application based on the display data received from the computer 103. At operation 906, the computer 103 detects that the same application has been maximized in the computer display 102. At operation 908, the computer 103 sends updated display data to the AR device 114 to minimize or remove a graphic user interface of the application in the virtual desktop generated by the AR device 114.

Figure 10:
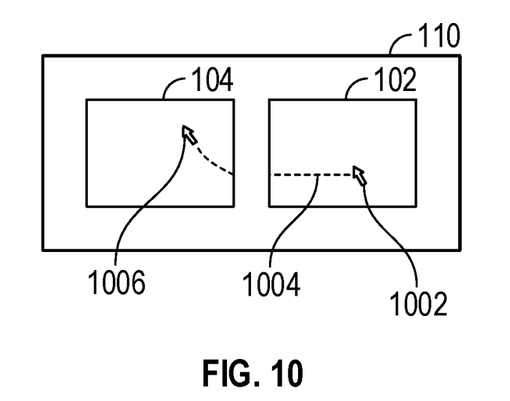
FIG. 10 is a block diagram illustrating a display of a virtual desktop seen from an augmented-reality device, according to one example embodiment.

FIG. 10 is a block diagram illustrating a display of a virtual desktop seen from an augmented-reality device, according to one example embodiment. The AR device display 110 displays the virtual display 104 adjacent to the (physical) computer display 102. A user of the computer 103 moves a mouse pointer from a location 1002 inside the computer display 102 to a location 1006 inside the virtual display 104 along a path 1004. The computer 103 detects which side of the computer display 102 the path 1004 crosses to determine which virtual display to update.

Figure 11:
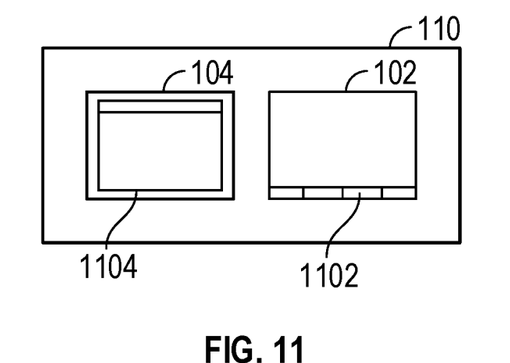
FIG. 11 is a block diagram illustrating a display of a virtual desktop seen from an augmented-reality device, according to one example embodiment.

FIG. 11 is a block diagram illustrating a display of a virtual desktop seen from an augmented-reality device, according to one example embodiment. The AR device display 110 displays the virtual display 104 adjacent to the (physical) computer display 102. An application is shown as being minimized 1102 in the computer display 102. The application is shown as being maximized 1104 in the virtual display 104.

Figure 12:
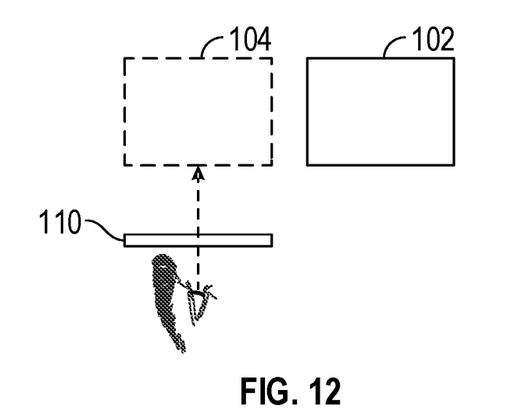
FIG. 12 is a block diagram illustrating a display of a virtual desktop seen from an augmented-reality device, according to one example embodiment.

FIG. 12 is a block diagram illustrating a display of a virtual desktop seen from an augmented-reality device, according to one example embodiment. The AR device 114 determines that the virtual display 104 is displayed in a central area of the AR device display 110 (or is gazed at by the user). The AR device 114 updates content of the virtual display 104 in response to the virtual display 104 being located in the central area of the AR device display 110. The AR device display 110 displays the virtual display 104 that appears to be next to the physical computer display 102.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor 208 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor 208 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 208 configured using software, the general-purpose processor 208 may be configured as respective different hardware modules at different times. Software may accordingly configure a processor 208, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between or among such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors 208 that are temporarily configured (e.g., by software) or permanently configured to perform the relevant operations. Whether temporarily or permanently configured, such processors 208 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 208 or processor-implemented modules. The performance of certain of the operations may be distributed among the one or more processors 208, not only residing within a single machine, but deployed across a number of machines. In some example embodiments, the processor or processors 208 may be located in a single location (e.g., within a home environment, an office environment, or a server farm), while in other embodiments the processors 208 may be distributed across a number of locations.

The one or more processors 208 may also operate to support performance of the relevant operations in a "cloud computing" environment or as "software as a service" (SaaS). For example, at least some of the operations may be performed by a group of computers (as examples of machines including processors 208), these operations being accessible via a network (e.g., the Internet 118) and via one or more appropriate interfaces (e.g., application programming interfaces (APIs)).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 208, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network (e.g., the Internet 118).

In example embodiments, operations may be performed by one or more programmable processors 208 executing a computer program to perform functions by operating on input data and generating output. Method operations can also be performed by, and apparatus of example embodiments may be implemented as, special-purpose logic circuitry (e.g., an FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 208), or in a combination of permanently and temporarily configured hardware may be a design choice. Below are set out hardware (e.g., machine) and software architectures that may be deployed, in various example embodiments.

Example Machine Architecture

Figure 13:
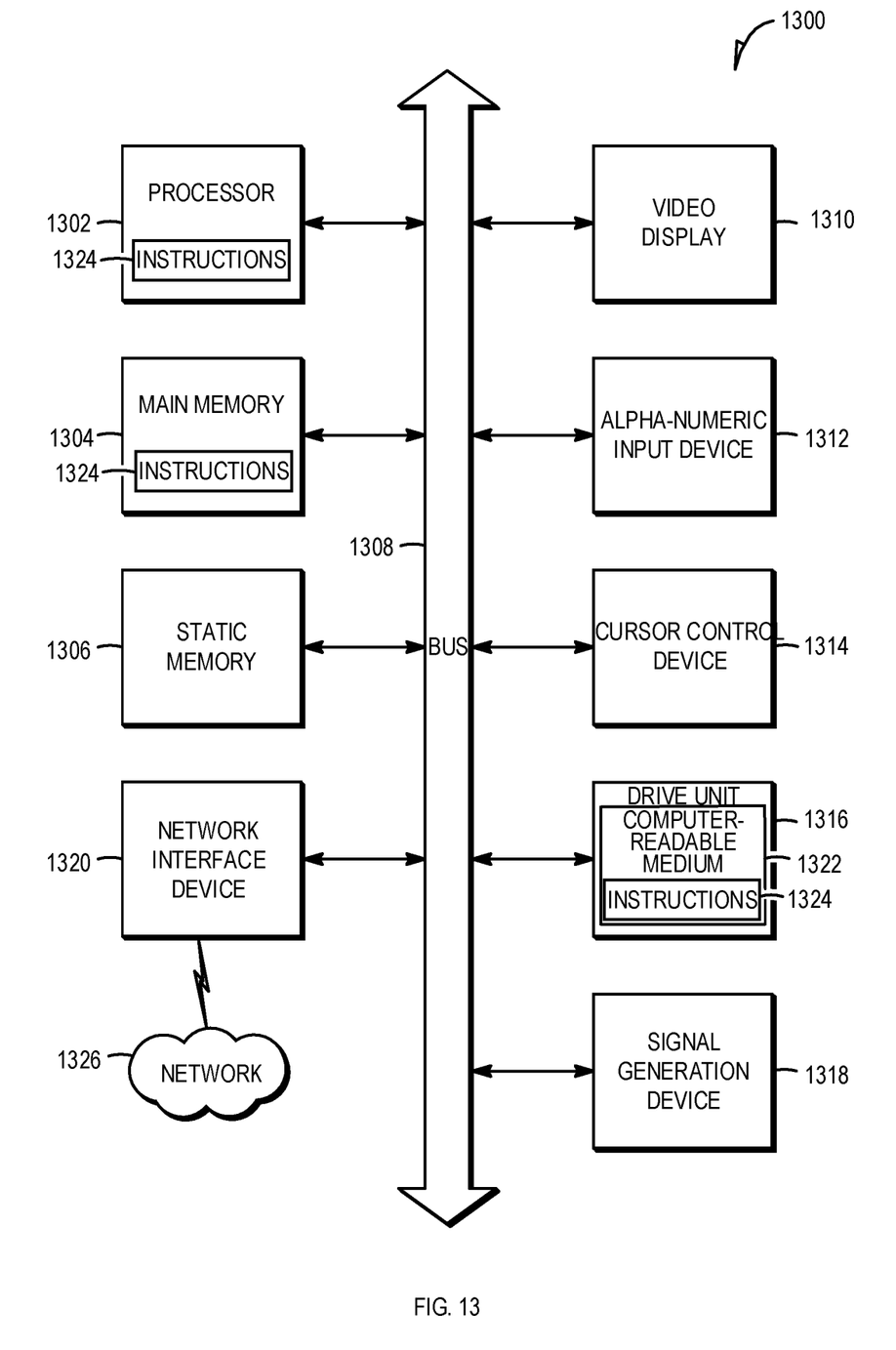
FIG. 13 is a block diagram illustrating components of a machine, according to some example embodiments, able to read instructions from a machine-readable medium and perform any one or more of the methodologies discussed herein.

FIG. 13 is a block diagram of a machine in the example form of a computer system 1300 within which instructions 1324 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, a network switch, a network bridge, or any machine capable of executing the instructions 1324 (sequential or otherwise) that specify actions to be taken by that machine. Further, while only a single machine is illustrated, the term "machine" shall also be taken to include any collection of machines that individually or jointly execute a set (or multiple sets) of instructions 1324 to perform any one or more of the methodologies discussed herein.

The example computer system 1300 includes a processor 1302 (e.g., a central processing unit (CPU), a graphics processing unit (GPU), or both), a main memory 1304, and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation (or cursor control) device 1314 (e.g., a mouse), a disk drive unit 1316, a signal generation device 1318 (e.g., a speaker), and a network interface device 1320.

Machine-Readable Medium

The disk drive unit 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media 1322. The instructions 1324 may also reside, completely or at least partially, within the static memory 1306.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding, or carrying the instructions 1324 for execution by the machine and that cause the machine to perform any one or more of the methodologies of the present embodiments, or that is capable of storing, encoding, or carrying data structures utilized by or associated with such instructions 1324. The term "machine-readable medium" shall accordingly be taken to include, but not be limited to, solid-state memories, and optical and magnetic media. Specific examples of machine-readable media 1322 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1324 may further be transmitted or received over a communication network 1326 using a transmission medium. The instructions 1324 may be transmitted using the network interface device 1320 and any one of a number of well-known transfer protocols (e.g., hypertext transfer protocol (HTTP)). Examples of communication networks 1326 include a local-area network (LAN), a wide-area network (WAN), the Internet, mobile telephone networks, plain old telephone service (POTS) networks, and wireless data networks (e.g., WiFi and WiMax networks). The term "transmission medium" shall be taken to include any intangible medium capable of storing, encoding, or carrying the instructions 1324 for execution by the machine, and includes digital or analog communications signals or other intangible media to facilitate communication of such software.

Although an embodiment has been described with reference to specific example embodiments, it will be evident that various modifications and changes may be made to these embodiments without departing from the scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An augmented-reality device comprising:
   an optical sensor;
   a transparent display; and
   one or more hardware processors comprising a virtual desktop application, the virtual desktop application configured to perform operations comprising:
   detecting, using the optical sensor, a first physical display device of a computer, the first physical display device being located within a display distance of the augmented-reality device;
   generating a virtual display device configured to operate as a second physical display device of the computer, the second physical display device configured to be controlled by the computer;
   displaying the virtual display device in the transparent display, the virtual display device appearing adjacent to the first physical display device;
   determining that a graphical display of a first application is maximized in the first physical display device and that a graphical display of a second application is minimized in the first physical display device, both the first application and the second application operating on the computer; and
   causing the graphical display of the second application to be maximized in the virtual display device in response to determining that the graphical display of the second application is minimized in the first physical display device.

2. The augmented-reality device of claim 1, wherein the operations further comprise:
    detecting the computer;
    generating a unique display identifier;
    causing the computer to display the unique display identifier in the first physical display device;
    detecting that the unique display identifier is displayed in the first physical display device; and
    confirming that the first physical display device is associated with the computer based on the detection.

3. The augmented-reality device of claim 1, wherein the operations further comprise:
    accessing a display content of an application operating on the computer connected to the first physical display device; and
    displaying the display content of the application in the virtual display device.

4. The augmented-reality device of claim 1, wherein the operations further comprise:
    accessing a display content of a second application operating on the computer, the computer configured to operate a first application; and
    displaying the display content of the second application in the virtual display device, a display content of the first application displayed in the first physical display device.

5. The augmented-reality device of claim 4, wherein computer is configured to detect a user input at the computer, to determine that the user input is related to the second application, and to update the content of the second application based on the user input, and
    wherein the operations further comprise:
    updating the content of the second application in the virtual display device in response to the user input at the computer.

6. The augmented-reality device of claim 1, wherein the operations further comprise:
    determining that the virtual display device is located within a central area of the transparent display; and
    causing the computer to update content of the virtual display device in response to determining that the virtual display device is located within the central area of the transparent display.

7. The augmented-reality device of claim 1, wherein the operations further comprise:
    determining that the virtual display device is located within a central area of the transparent display;
    notifying the computer that the virtual display device has been selected in response to the determining that the virtual display device is located within the central area of the transparent display, the computer configured to receive a user input related to a second application displayed in the virtual display device in response to the notifying, both the second application and a first application operating on the computer; and
    causing the computer to update content of the virtual display device in response to the user input.

8. The augmented-reality device of claim 1, wherein the operations further comprise:
    determining that the graphical display of the second application is maximized in the first physical display device; and
    causing the graphical display of the second application to be minimized in the virtual display device in response to determining that the graphical display of the second application is maximized in the first physical display device.

9. The augmented-reality device of claim 1, wherein the operations further comprise:
    communicating with a display driver of the computer, the display driver configured to generate a first desktop area in the first physical display device and to generate a second desktop area in the virtual display device, the second desktop area being an expansion of the first desktop area.

10. A method comprising:
    detecting, using an optical sensor of an augmented-reality device, a first physical display device of a computer, the first physical display device being located within a display distance of the augmented-reality device;
    generating a virtual display device configured to operate as a second physical display device of the computer, the second physical display device configured to be controlled by the computer;
    displaying the virtual display device in the transparent display, the virtual display device appearing adjacent to the first physical display device;
    determining that a graphical display of a first application is maximized in the first physical display device and that a graphical display of a second application is minimized in the first physical display device, both the first application and the second application operating on the computer; and
    causing the graphical display of the second application to be maximized in the virtual display device in response to determining that the graphical display of the second application is minimized in the first physical display device.

11. The method of claim 10, further comprising:
    detecting the computer;
    generating a unique display identifier;
    causing the computer to display the unique display identifier in the first physical display device;
    detecting that the unique display identifier is displayed in the first physical display device; and
    confirming that the first physical display device is associated with the computer based on the detection.

12. The method of claim 10, further comprising:
    accessing a display content of an application operating on the computer connected to the first physical display device; and
    displaying the display content of the application in the virtual display device.

13. The method of claim 10, further comprising:
    accessing a display content of a second application operating on the computer, the computer configured to operate a first application; and
    displaying the display content of the second application in the virtual display device, a display content of the first application displayed in the first physical display device.

14. The method of claim 13, wherein the computer is configured to detect a user input at the computer, to determine that the user input is related to the second application, and to update the content of the second application based on the user input, and
    wherein the method further comprises:
    updating the content of the second application in the virtual display device in response to the user input at the computer.

15. The method of claim 10, further comprising:
determining that the virtual display device is located within a central area of the transparent display; and
causing the computer to update content of the virtual display device in response to determining that the virtual display device is located within the central area of the transparent display.

16. The method of claim 10, further comprising:
determining that the virtual display device is located within a central area of the transparent display;
notifying the computer that the virtual display device has been selected in response to the determining that the virtual display device is located within the central area of the transparent display, the computer configured to receive a user input related to a second application displayed in the virtual display device in response to the notifying, both the second application and a first application operating on the computer; and
causing the computer to update content of the virtual display device in response to the user input.

17. The method of claim 10, further comprising:
determining that the graphical display of the second application is maximized in the first physical display device; and
causing the graphical display of the second application to be minimized in the virtual display device in response to determining that the graphical display of the second application is maximized in the first physical display device.

18. A non-transitory computer-readable medium comprising instructions that, when executed by one or more processors of a computer, cause the computer to perform operations comprising:
detecting, using an optical sensor of an augmented-reality device, a first physical display device of a computer, the first physical display device being located within a display distance of the augmented-reality device;
generating a virtual display device configured to operate as a second physical display device of the computer, the second physical display device configured to be controlled by the computer;
displaying the virtual display device in the transparent display, the virtual display device appearing adjacent to the first physical display device;
determining that a graphical display of a first application is maximized in the first physical display device and that a graphical display of a second application is minimized in the first physical display device, both the first application and the second application operating on the computer; and
causing the graphical display of the second application to be maximized in the virtual display device in response to determining that the graphical display of the second application is minimized in the first physical display device.

* * * * *